(12) United States Patent
Sæther

(10) Patent No.: US 11,940,062 B2
(45) Date of Patent: Mar. 26, 2024

(54) PIPELINE DEPLOYMENT AND TIE-IN METHOD

(71) Applicant: Equinor Energy AS, Stavanger (NO)

(72) Inventor: Morten Sæther, Lillestrøm (NO)

(73) Assignee: EQUINOR ENERGY AS, Stavanger (NO)

( * ) Notice: Subject to any disclaimer, the term of this patent is extended or adjusted under 35 U.S.C. 154(b) by 283 days.

(21) Appl. No.: 17/442,855

(22) PCT Filed: Mar. 9, 2020

(86) PCT No.: PCT/NO2020/050063
§ 371 (c)(1),
(2) Date: Sep. 24, 2021

(87) PCT Pub. No.: WO2020/197402
PCT Pub. Date: Oct. 1, 2020

(65) Prior Publication Data
US 2022/0178472 A1    Jun. 9, 2022

(30) Foreign Application Priority Data
Mar. 27, 2019    (GB) ..................................... 1904239

(51) Int. Cl.
*F16L 1/235*    (2006.01)
*E21B 43/013*    (2006.01)
(Continued)

(52) U.S. Cl.
CPC ............ *F16L 1/235* (2013.01); *E21B 43/013* (2013.01); *F16L 1/19* (2013.01); *F16L 41/06* (2013.01)

(58) Field of Classification Search
CPC ..... F16L 41/06; F16L 1/12; F16L 1/19; F16L 1/235; E21B 43/013
See application file for complete search history.

(56) References Cited

U.S. PATENT DOCUMENTS 6,004,072 A * 12/1999 Cunningham .......... F16L 41/06
    285/31
6,290,432 B1 * 9/2001 Exley ....................... F16L 1/26
    15/104.062

(Continued)

FOREIGN PATENT DOCUMENTS

| WO | WO 2018/111120 A1 | 6/2018 |
| WO | WO 2019/076580 A1 | 4/2019 |
| WO | WO 2019/125174 A1 | 6/2019 |

OTHER PUBLICATIONS

International Search Report, issued in PCT/NO2020/050063, dated Apr. 24, 2020.

(Continued)

*Primary Examiner* — Aaron L Lembo
(74) *Attorney, Agent, or Firm* — Birch, Stewart, Kolasch & Birch, LLP

(57) ABSTRACT

A method of installing a subsea pipeline for tie-in to a subsea structure includes laying, using a pipe laying vessel, an intermediate section of the pipeline on to a pipe restraint device, wherein the pipe restraint device is at or near the subsea structure, or is at or near a location at which a subsea structure will be installed, and the pipe restraint device restricts transverse movement of the pipeline. The intermediate section of the pipeline is configured to be tapped at or near the pipe restraint device for providing fluid communication between the pipeline and the subsea structure.

13 Claims, 5 Drawing Sheets

(51) Int. Cl.
    *F16L 1/19*          (2006.01)
    *F16L 41/06*        (2006.01)

(56) References Cited

U.S. PATENT DOCUMENTS

| | | | |
|---|---|---|---|
| 11,287,062 B2 * | 3/2022 | Ilstad | F16L 1/26 |
| 2008/0273934 A1 * | 11/2008 | Morgan | B23B 51/0426 |
| | | | 408/206 |
| 2021/0164588 A1 * | 6/2021 | Schjerpen | F16L 1/20 |

OTHER PUBLICATIONS

United Kingdom Combined Search and Examination Report, issued in Priority Application No. 1904239.9, dated Jul. 8, 2019.
Written Opinion of the International Searching Authority, issued in PCT/NO2020/050063, dated Apr. 24, 2020.

* cited by examiner

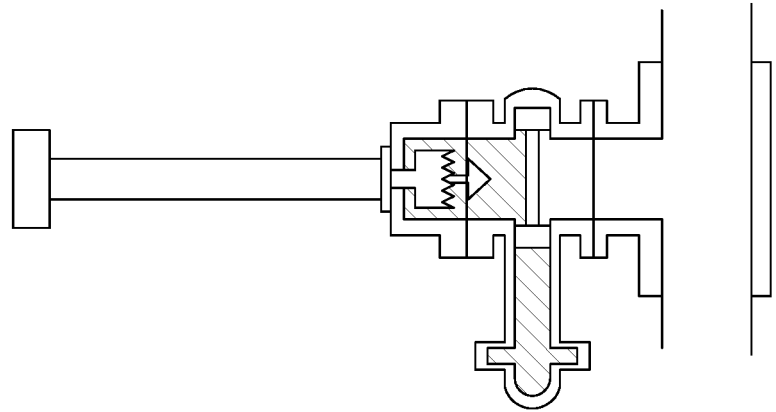
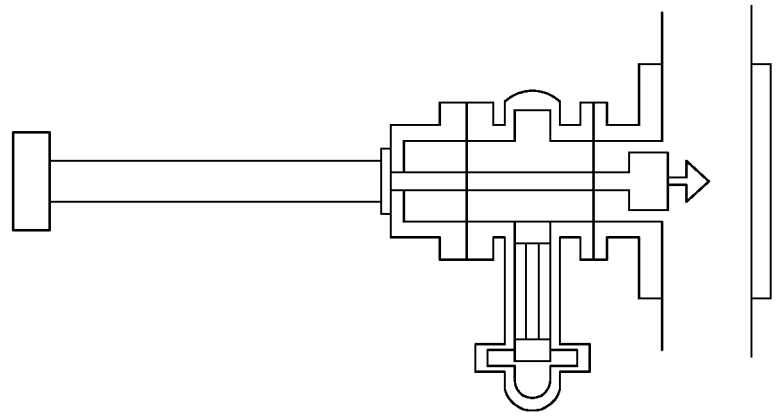
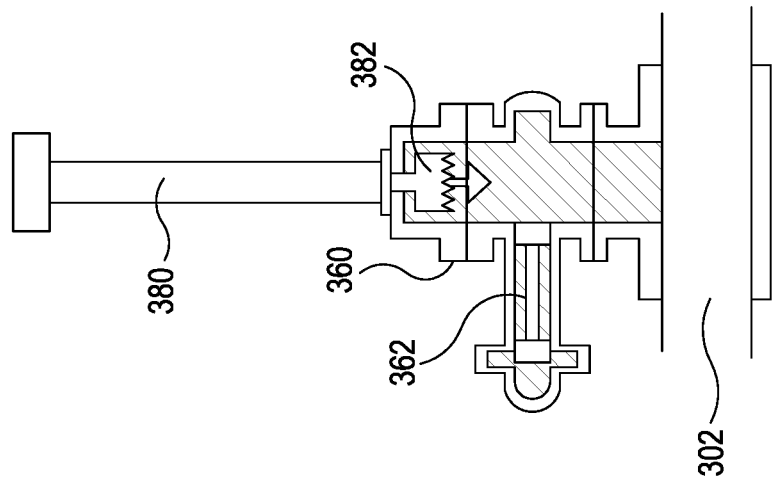

S402 — Lay, using a pipe laying vessel, an intermediate section of a pipeline on to a pipe restraint device, wherein the pipe restraint device is at or near the subsea structure, or is at or near a location at which a subsea structure will be installed, and the pipe restraint device restricts transverse movement of the pipeline, wherein the intermediate section of the pipeline is configured to be tapped at or near the pipe restraint device for providing fluid communication between the pipeline and the subsea structure.

Figure 4

PIPELINE DEPLOYMENT AND TIE-IN METHOD

TECHNICAL FIELD

The present invention relates to the deployment and tie-in of subsea pipelines used for the transportation of hydrocarbons.

BACKGROUND

Pipelines for the transport of hydrocarbons, e.g. oil or gas, are typically laid along the seabed using a laying vessel. Such subsea pipelines can be installed between, for example, two subsea structures, where the subsea structures may be "christmas trees", riser bases, manifolds, templates or some other structures. Often one or both ends of the pipeline are connected (or "tied-in") to a subsea structure using a separate jumper or spool. Direct tie-in methods can also be used. Direct tie-in methods include: direct pull-in, in which an end of the pipeline is pulled close to the subsea structure using a winch located on the laying vessel, and the tie-in is completed using a remotely operated vehicle (ROV) and alignment apparatus; deflect to connect, in which a wire is attached to the end of the pipeline, where the wire is routed through the subsea structure to a winch, and the wire is used to pull the subsea end of the pipeline directly to the subsea structure; and connect and lay-away, in which the subsea end of the pipeline is connected to the subsea structure at the surface, and the subsea structure is then lowered to the seabed before the laying vessel lays the pipeline by stepping away from the subsea structure.

A typical approach to pipelaying will involve careful design of the subsea structure and of the pipeline configuration in order to ensure that, when laid, the tie-in end of the pipeline is in the correct location and orientation with respect to the connector on the subsea structure.

During the direct tie-in process, a high tensile force may be applied to the end of the pipeline, putting the pipeline under tension, in order to bring the end of the pipeline up to the connection point and complete the tie-in process. The forces applied to the pipeline during direct tie-in can be high. This makes high demands of the installation equipment and pipeline structure. Furthermore, at least in the absence of some compensating mechanism, the forces can cause damage to the pipeline and to the connector on the subsea structure.

As set out above, typical pipeline tie-in procedures may require the application of large forces and complicated procedures to connect an end connection of a pipeline, or to bring a pipeline to a position where connection via a jumper or similar flowline is possible.

SUMMARY OF INVENTION

It is an object of the present invention to overcome or at least mitigate the problems identified above.

According to a first aspect of the present invention there is provided a method of installing a subsea pipeline for tie-in to a subsea structure, comprising: laying, using a pipe laying vessel, an intermediate section of the pipeline on to a pipe restraint device, wherein the pipe restraint device is at or near the subsea structure, or is at or near a location at which a subsea structure will be installed, and the pipe restraint device restricts transverse movement of the pipeline, wherein the intermediate section of the pipeline is configured to be tapped at or near the pipe restraint device for providing fluid communication between the pipeline and the subsea structure.

The pipe restraint device may be a pipe guide, a pipe gripper, a pipe clamp or a pipe tapping clamp.

The pipe restraint device may be in a first configuration that permits longitudinal movement of the pipeline.

The pipe restraint device may not be a pipe tapping clamp, and the method may further comprise installing a pipe tapping clamp at or near the pipe restraint device.

The subsea structure may be in situ on the seabed, and the subsea structure may comprise the pipe restraint device.

The subsea structure may be in situ on the seabed, and the pipe restraint device may be a pipe tapping clamp that is pre-installed in the subsea structure.

The method may further comprise moving the pipe restraint device to a second configuration in which the pipeline is clamped by the pipe restraint device to restrict longitudinal movement of the pipeline.

The method may further comprise: clamping the pipeline using a pipe tapping clamp to thereby restrict longitudinal movement of the pipeline; and tapping the pipeline through the pipe tapping clamp. The method may still further comprise connecting a conduit between the pipe tapping clamp and the subsea structure to thereby provide fluid communication between the pipeline and the subsea structure. The pipeline may be tapped before production of hydrocarbons through the pipeline begins. The pipeline may be tapped after production of hydrocarbons through the pipeline has begun.

The intermediate section of the pipeline may include a prepared section of the pipeline.

According to a second aspect of the present invention there is provided a subsea structure comprising a pipe restraint device, wherein the pipe restraint device is configured to receive an intermediate section of a pipeline laid from a pipe laying vessel, wherein the intermediate section of the pipeline is configured to be tapped at or near the pipe restraint device for providing fluid communication between the pipeline and the subsea structure.

The subsea structure may be a template, manifold or Christmas tree.

Embodiments of the invention will now be described by way of example only and with reference to the accompanying drawings, in which:

BRIEF DESCRIPTION OF DRAWINGS

FIG. 3A illustrates an initial stage of a process of tapping the pipeline through a pipe tapping clamp, using a pipe-tapping device.

FIG. 3B illustrates a subsequent stage of a process of tapping the pipeline through a pipe tapping clamp, using a pipe-tapping device.

FIG. 3C illustrates further subsequent stage of a process of tapping the pipeline through a pipe tapping clamp, using a pipe-tapping device.

FIG. 4 shows a high-level flow diagram describing the method.

DETAILED DESCRIPTION

The invention relates to a method for installing a subsea pipeline for tie-in to a subsea structure. The method comprises laying, using a pipe laying vessel, an intermediate section of the pipeline on to a pipe restraint device, wherein the pipe restraint device is at or near the subsea structure, or is at or near a location at which a subsea structure will be installed, and the pipe restraint device restricts transverse movement of the pipeline. The intermediate section of the pipeline is a portion of the pipeline located between the two ends of the pipeline. Where the pipe restraint device is part of the subsea structure, the pipeline is laid therefore laid over the subsea structure. The pipe restraint device may be located at or near a location at which a subsea structure will be, or may be, installed in the future. In this case, the pipeline can be laid over the pipe restraint device to facilitate easy tie-in to the subsea structure when, or if, the subsea structure is eventually installed at the seabed.

The intermediate section of the pipeline is configured to be tapped at or near the pipe restraint device for providing fluid communication between the pipeline and the subsea structure. The method of the invention allows a pipeline to be laid continuously, while still ensuring that the pipeline is held in a position that will allow tie-in to a subsea structure. This is advantageous because there is no need to cut, position, and potentially tie-in an end of a pipeline as part of the laying process, procedures which are complicated, expensive and time-consuming. The pipe restraining device initially restricts transverse movement of the pipeline, i.e. movement of the pipeline substantially orthogonal to the direction in which the pipeline is laid, but does not restrict longitudinal movement of the pipeline. This allows the pipeline to move longitudinally during the laying process, mitigating the forces on the pipeline, since the pipeline is allowed to settle into a rest position. The method therefore removes, or at least mitigates, the need for the application of large forces during a tie-in procedure, reducing the likelihood of damage to equipment.

Figure 1A:
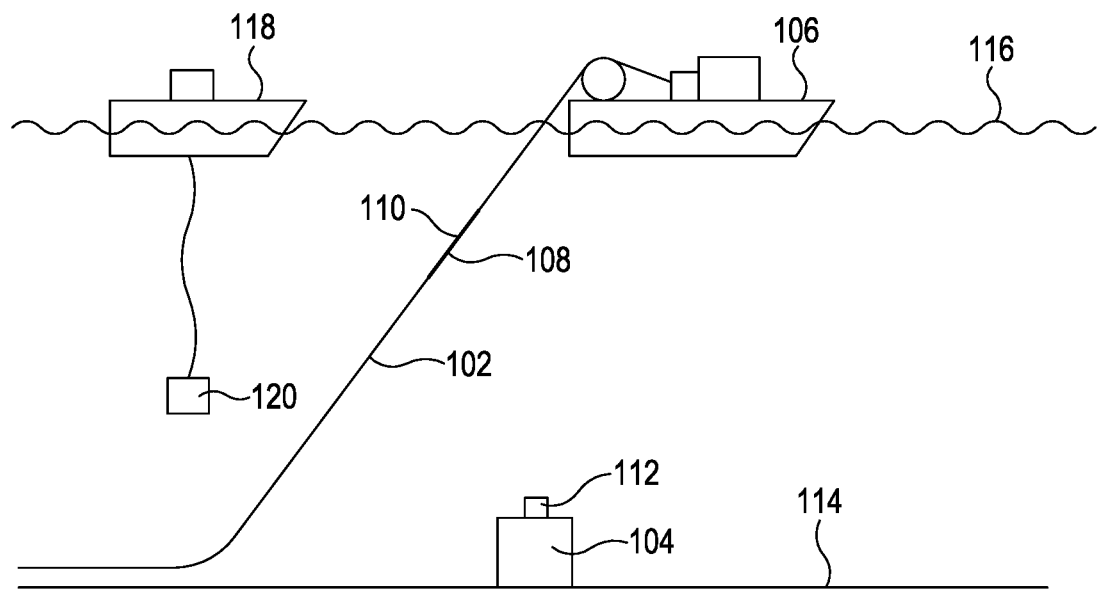
FIG. 1A shows an initial stage of the installation method, with a pipeline being deployed from a laying vessel.

FIG. 1A shows an initial stage of the method. A pipe laying vessel 106 at the surface 116 of a body of water moves in a forward direction and deploys a pipeline 102. The pipeline 102 is e.g. a production pipeline configured to transport produced hydrocarbons. The pipeline 102 is laid along the seabed 114, or the bed of the body of water. A subsea structure 104 is located on the seabed 114. In one embodiment the subsea structure 104 is a structure associated with a well in a formation beneath the seabed 114. In this embodiment the subsea structure is e.g. one or more of a template, a drilling template, a Christmas tree (XMT) and a manifold. In an alternative embodiment the subsea structure is a support structure associated with a future pipeline junction or pipeline tie-in, e.g. a scaffolding and/or manifold that will be used to facilitate a future connection to a second pipeline. In the embodiment shown in FIG. 1A the subsea structure 104 includes a pipe restraint device 112. Alternatively, the pipe restraint device 112 is separate from, but located near, the subsea structure 104. In a further alternative embodiment the pipe restraint device 112 is located at or near the seabed 114, and no subsea structure is yet present. In this case, the pipe restraint device 112 is located at or near a location at which a subsea structure will be, or may be, installed in the future.

The pipe restraint device 112 is any device capable of holding a pipeline and restricting the movement of the pipeline. For example, the pipe restraint device is a pipe guide, a pipe gripper, a pipe clamp or a pipe tapping clamp. A second vessel 118 and a remotely operated underwater vehicle (ROV) 120 controlled from the second vessel 118 may be used in the method. The pipeline 102 has an intermediate section 108 to be laid on to the pipe restraint device 112. The intermediate section 108 does not include any end portion of the pipeline, and is preferably distant from an end of the pipeline. The intermediate section 108 may include a prepared section 110 of the pipeline which has been made ready for a tapping procedure. In one embodiment the prepared section 110 is a polished section of the pipeline. In particular, the polished section has been cleaned and any unneeded outer coatings have been removed, to facilitate a good seal with a tapping clamp. In an alternative embodiment the prepared section of the pipeline comprises a coating that is applied only to the prepared section. In a further alternative embodiment the prepared section includes circumferential grooves cut into the surface of the pipeline to accommodate a tapping clamp. The prepared section 110 may be longer than is strictly required to facilitate a good seal with a tapping clamp. That is, the prepared section may extend beyond the pipe restraint device, tapping clamp and/or subsea structure once the pipeline has been laid on to the pipe restraint device. For example, the prepared section may extend 5 m beyond each end of the pipe restraint device. This extra length of the prepared section provides greater flexibility for laying the pipeline on to the pipe restraint device, by accounting for lower accuracy in laying the pipeline and/or shifts in the pipeline's position once the pipeline has been laid on to the pipe restraint device.

Figure 1B:
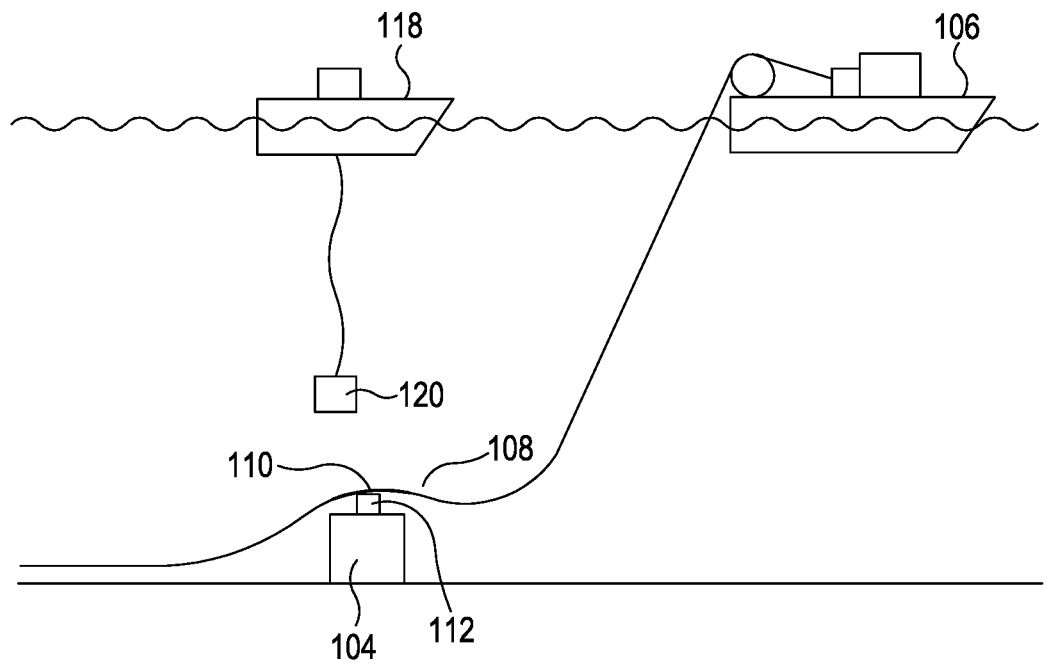
FIG. 1B shows a later stage of the installation method, after an intermediate section of the pipeline has been laid on to a pipe restraint device.

FIG. 1B shows a subsequent stage of the method. As the pipe laying vessel 106 moves forward and deploys the pipeline 102, the intermediate section 108 of the pipeline 102 is laid on to the pipe restraint device 112. In the embodiment shown in FIG. 1B the pipe restraint device 112 is included in the subsea structure 104 and the pipeline is laid over the subsea structure 104. In the case that the pipe restraint device 112 is separate from the subsea structure 104, or extends horizontally from the subsea structure 104, or is located on the seabed at or near a location at which a subsea structure will be or may be installed in the future, the pipeline may be laid over the pipe restraint device such that the subsea structure 104 is not located beneath the pipeline 102.

In the embodiment shown in FIG. 1B the prepared section 110 of the pipeline is laid on to the pipe restraint device. Alternatively, if the pipe restraint device 112 is not a pipe tapping clamp, a section of the pipeline 102 adjacent to the prepared section 110 may be laid on to the pipe restraint device 112. The ROV 120 may be used to help lay the pipeline 102 on to the pipe restraint device 112. Other techniques may be used to move the pipeline into position on the pipe restraint device. For example, a pull-in wire extending from a vessel may be used, optionally in combination with a winch and/or pulleys. In the embodiment shown in FIG. 1A the pipe restraint device 112 is in an open state configured to receive the pipeline. Once the pipeline has been laid on to the pipe restraint device 112, the pipe restraint device is moved to a first configuration in which transverse motion of the pipeline is restricted, but longitudinal motion of the pipeline is not restricted. The ROV 120 may be used to move the pipe restraint device from the open state to the first configuration. Alternatively, the pipe restraint device may include a sprung clip, a v-shaped pipe guide, or other similar components so that it is not necessary to move the restraint device into a different configuration in order to restrict transverse motion of the pipeline, such that transverse motion of the pipeline is restricted once the pipeline has been laid on to the pipe restraint device, and no further operations are necessary to achieve this.

Figure 1C:
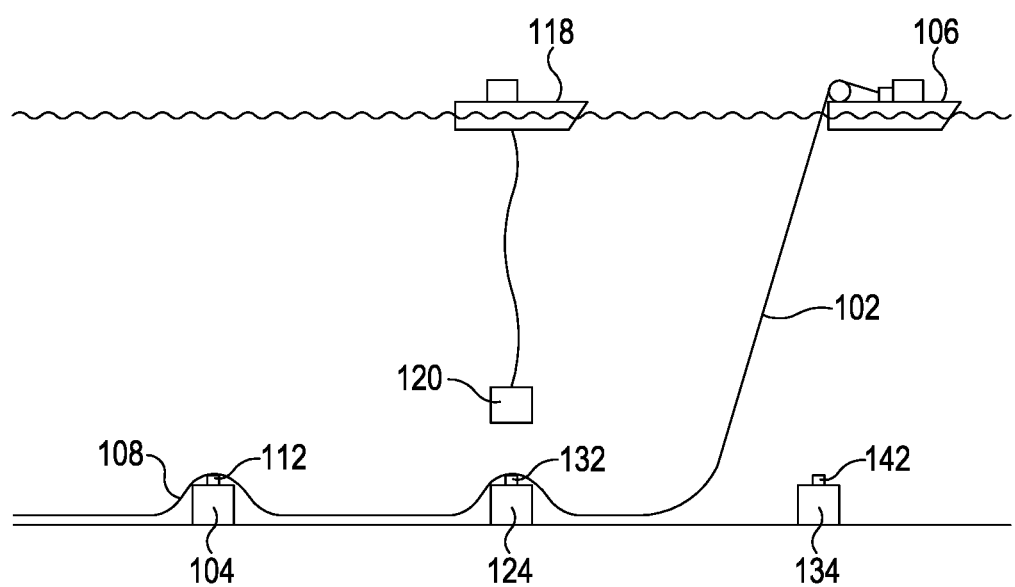
FIG. 1C illustrates the installation method for a case in which a pipeline has been laid over multiple subsea structures.

FIG. 1C shows a still later, optional, stage of the method in which the pipeline is laid over further pipe restraint devices 132,142. Once the pipeline has been laid over the first pipe restraint device 112 as set out above in relation to FIG. 1A and FIG. 1B, the same procedure can be used to lay the pipeline over further pipe restraint devices. In the embodiment shown in FIG. 1C the pipeline 102 has been laid over a first pipe restraint device 112 and subsea structure 104, and the pipeline's transverse motion is restricted by pipe restraint device 112. The pipeline 102 has also been laid over a second pipe restraint device 132 and subsea structure 124, and will be laid over a third pipe restraint device 142 and subsea structure 134. In the pipeline installation method illustrated in FIG. 1C the pipeline is restrained at certain locations, i.e. at the pipe restraint devices 112,132,142, to facilitate tie-in to subsea structures, but the method does not require time-consuming and complex tie-in procedures to be performed as part of the pipeline laying operation. This means that the pipeline can be laid essentially or almost continuously, saving on vessel time and costs.

Figure 2A:
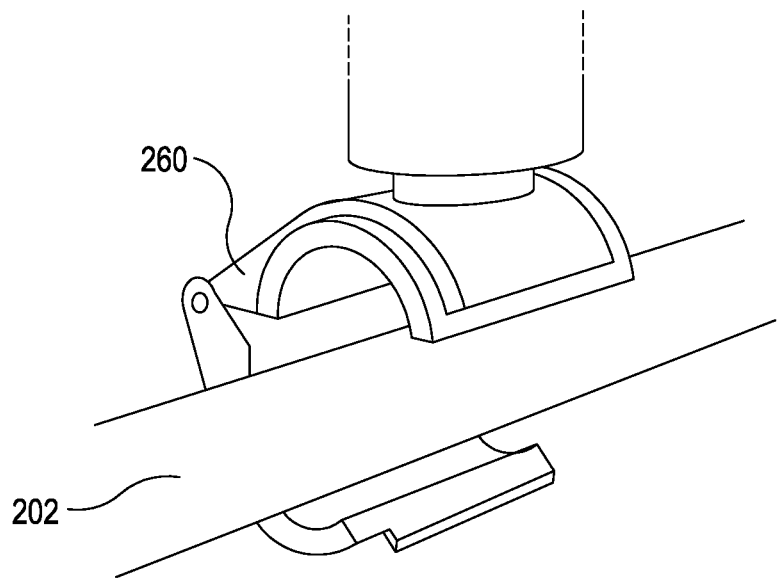
FIG. 2A shows a pipe tapping clamp as an example of a pipe restraint device.
Figure 2B:
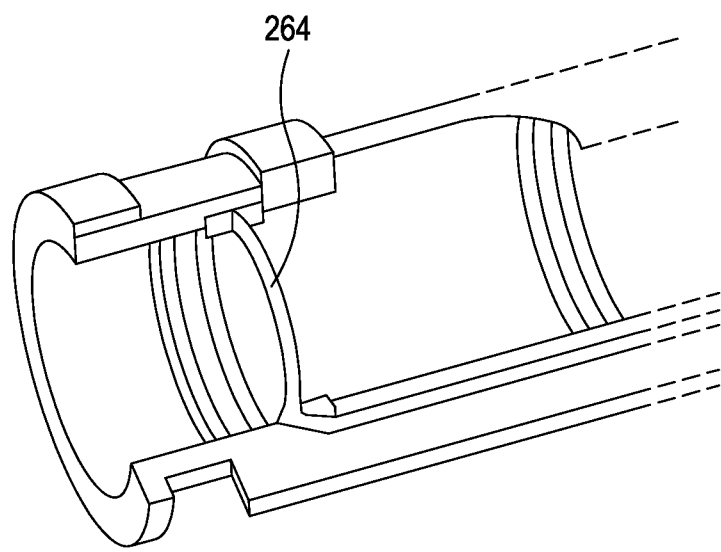
FIG. 2B illustrates a seal of the pipe tapping clamp shown in FIG. 2A.

FIGS. 2A and 2B show a pipe tapping clamp as an example of a pipe restraint device. FIG. 2A shows a pipe tapping clamp 260 in an open configuration and a pipeline 202 extending through the open pipe tapping clamp 260. In FIG. 2A the intermediate section of the pipeline 202 is not a prepared section of the pipeline, but preferably the intermediate section will be prepared. In FIG. 2A the pipe tapping clamp 260 is shown in a vertically downward orientation in which a clamping portion 268 of the pipe tapping clamp 260 is vertically underneath and supported by a supporting structure 266 of the pipe tapping clamp 260. The pipe tapping clamp 260 may be installed in a different orientation to facilitate laying of the pipeline 202 on to the pipe tapping clamp 260. For example, the pipe tapping clamp may be in a vertically upward orientation in which the clamping portion 268 is vertically above the supporting structure 266. Alternatively, the pipe tapping clamp may be in a horizontal or angled orientation in which the clamping portion 268 is not centred in the same vertical plane as the supporting structure 266. FIG. 2B shows the pipe tapping clamp of FIG. 2A in a different configuration, and illustrates a seal 264 of the pipe tapping clamp 260. In a tapping operation (described in more detail below) the seal or seals 264 will be brought into close contact with the prepared section of the pipeline 202, to ensure that no fluid will leak out of the pipe tapping clamp 260. As set out above, the pipe restraint device may alternatively be a pipe guide or a pipe gripper. The pipe tapping clamp may be included in an apparatus that also includes a pipe gripper and/or a pipe guide.

If the pipe restraint device is not a pipe tapping clamp 260 (e.g. if the pipe restraint device is a pipe guide 250 or pipe gripper 270), it will be necessary at some stage to connect a pipe tapping clamp to the pipeline, to allow fluid communication to be provided between the pipeline and the subsea structure. In one embodiment the pipe tapping clamp is already in situ before the pipeline is laid. The in situ pipe tapping clamp may be included in the subsea structure, or may be separate from any subsea structure. Alternatively, the pipe tapping clamp is installed at any time after the pipeline has been laid on to the pipe restraint device. If a subsea structure is already in situ (either separate from, or including, the pipe restraint device), the pipe tapping clamp may be installed in the subsea structure at a later stage. In this way the method of the invention allows a pipeline to be laid quickly and efficiently, while providing the infrastructure to facilitate simple and low-cost tie in to a subsea structure at any time after the pipeline is laid. The pipe restraint device restricts transverse (and sometimes longitudinal) movement of the pipeline. The pipe tapping clamp is preferably located close to the pipe restraint device, because the location of the pipeline is more certain near to the pipe restraint device. If the pipe tapping clamp is in situ before the pipeline is laid, the pipeline may be laid over the pipe restraint device and the pipe tapping clamp in the same laying operation, e.g. as described for FIGS. 1A and 1B. In this case the pipe tapping clamp may be left open until a tapping operation is begun, or the pipe tapping clamp may be partially or fully closed to ensure that the pipeline is retained within the pipe tapping clamp. If the pipe tapping clamp is installed at some time after the pipeline has been laid on to the pipe restraint device, the pipe tapping clamp is preferably installed and coupled to the pipeline without the application of large forces to the pipeline. For example, the pipe tapping clamp may be coupled to the pipeline using an ROV, or if the pipe tapping clamp is part of a subsea structure, the subsea structure may be installed in a location that permits the pipe tapping clamp to be coupled to the pipeline without the application of large forces to the pipeline. Alternatively, it may be necessary to move the pipeline, e.g. using a winch and pull-in line, to facilitate the coupling of the pipe tapping clamp to the pipeline.

After the operations described above for FIGS. 1A and 1B (and optionally FIG. 1C), the pipe restraint device 112 is in a first configuration in which the transverse motion of the pipeline is restricted. At some point before a tapping operation is begun it is necessary to also restrict longitudinal motion of the pipeline. To achieve this, the pipe restraint device is moved into a second configuration in which transverse and longitudinal motion of the pipeline is restricted. If the pipe restraint device is a pipe tapping clamp 260, in the first configuration the pipe tapping clamp may be partially or fully closed, but without fully clamping down on the pipeline. In the second configuration the pipe tapping clamp is fully closed and is fully clamping down on the pipeline, with the seal 264 engaged with the surface of the pipeline 202. If the pipe restraint device is a pipe gripper, in the first configuration the pipe gripper may loosely grip the pipeline, and in the second configuration the pipe gripper tightly grips the pipeline. If the pipe restraint device 112 is not a pipe tapping clamp 260, then, as set out above, a pipe tapping clamp must at some stage be coupled to the pipeline. If a pipe restraint device and a pipe tapping clamp are coupled to the pipeline, the longitudinal motion of the pipeline can be restricted using the pipe restraint device and/or the pipe tapping clamp. The longitudinal motion of the pipeline can be restricted using the pipe restraint device and/or a pipe tapping clamp at any time after the pipeline has been laid over the pipe restraint device. However, it is preferable to wait for the pipeline laying operation to be fully completed, and for the pipeline to settle into a rest position, before the pipeline is clamped to restrict its longitudinal motion.

FIGS. 3A, 3B and 3C illustrate a procedure for tapping the pipeline 302 to provide fluid communication between the pipeline 302 and a subsea structure. The tapping procedure can be carried out before production begins through the pipeline, i.e. 'cold tapping', or after production through the pipeline has begun, i.e. 'hot tapping'.

In an initial step of the tapping procedure shown in FIG. 3A, the pipeline 302 is held in the pipe tapping clamp 360. In particular, the pipeline 302 is clamped in the pipe tapping clamp 360 such that transverse movement and longitudinal movement of the pipeline 302 is restricted, and preferably prevented entirely. The seal 264 shown in FIG. 2B is engaged with the prepared section of the pipeline 302, preventing the passage of fluid from one side of the seal to the other, i.e. preventing fluid leaks. The pipe tapping clamp 360 includes a valve or seal 362 that is initially open, as shown in FIG. 3A. There is no fluid communication between the pipeline and the pipe tapping clamp. A cutting or milling device 380 including a blade 382 is coupled to the pipe tapping clamp 360 such that the blade 382 is located within a conduit 365 of the pipe tapping clamp 360. The cutting device 380 may be transported to the pipe tapping clamp, and coupled to the pipe tapping clamp using an ROV. Alternatively, the cutting device is included in the pipe tapping clamp. The cutting device may be operated using the ROV. In a subsequent step shown in FIG. 3B, the cutting device extends through the conduit 365 of the pipe tapping clamp and the blade 382 engages with the pipeline 302. A section of the pipeline is cut out using the blade, and the cutting device retains the cut-out section of the pipeline. As shown in FIG. 3C, the cutting device retracts back though the conduit of the pipe tapping clamp carrying the cut-out section of the pipeline, and the valve or seal 362 is closed, preventing any fluid from exiting the pipe tapping clamp. The cutting device will subsequently be de-coupled and from the pipe tapping clamp. The pipe tapping clamp includes fluid ports to which fluid lines may be connected. Each of the fluid ports may be capped/sealed to prevent any exit of fluid. In the configuration shown in FIG. 3C, there is fluid communication between the pipeline and the conduit of the pipe tapping clamp. Once the cutting device has been removed, the valve is closed and/or the fluid port(s) of the tapping clamp are capped, the pipe tapping clamp can be left in situ, coupled to the pipeline, for any length of time required.

In a subsequent operation (not shown in the Figures), fluid communication is provided between the pipeline and the subsea structure. The pipe tapping clamp may include a manifold that is in fluid communication with the conduit of the pipe tapping clamp. In this case a jumper or flowline will be connected between the manifold and the subsea structure. Alternatively, an apparatus including the pipe tapping clamp may also include a manifold that is not in fluid communication with the pipe tapping clamp, or the subsea structure may include a manifold. In this case a jumper or flowline is coupled between the conduit of the pipe tapping clamp and the manifold, and the manifold is connected to the subsea structure if required. The valve 362 is then opened to provide fluid communication between the pipeline and the subsea structure, via the conduit of the pipe tapping clamp and a manifold.

FIG. 4 shows a high-level flow diagram describing a method in accordance with the invention. In step S402, an intermediate section (108) of a pipeline (102) is laid on to a pipe restraint device (112) using a pipe laying vessel (106), wherein the pipe restraint device (112) is at or near the subsea structure (104), or is at or near a location at which a subsea structure will be installed, and the pipe restraint device (112) restricts transverse movement of the pipeline (102). The intermediate section (108) of the pipeline (102) is configured to be tapped at or near the pipe restraint device (112) for providing fluid communication between the pipeline (102) and the subsea structure (104).

It will be appreciated by the person of skill in the art that various modifications may be made to the above described embodiments without departing from the scope of the present invention.

The invention claimed is:

1. A method of installing a subsea pipeline for tie-in to a subsea structure, comprising:
   laying, using a pipe laying vessel, an intermediate section of the pipeline on to a pipe restraint device, wherein the pipe restraint device is at or near the subsea structure, or is at or near a location at which a subsea structure will be installed, and the pipe restraint device restricts transverse movement of the pipeline,
   wherein the intermediate section of the pipeline is configured to be tapped at or near the pipe restraint device for providing fluid communication between the pipeline and the subsea structure.

2. The method of claim 1, wherein the pipe restraint device is a pipe guide, a pipe gripper, a pipe clamp or a pipe tapping clamp.

3. The method of claim 2, wherein the pipe restraint device is in a first configuration that permits longitudinal movement of the pipeline.

4. The method of claim 1, wherein the pipe restraint device is in a first configuration that permits longitudinal movement of the pipeline.

5. The method of claim 1, wherein the pipe restraint device is not a pipe tapping clamp, and the method further comprises installing a pipe tapping clamp at or near the pipe restraint device.

6. The method of claim 1, wherein the subsea structure is in situ on a seabed, and the subsea structure comprises the pipe restraint device.

7. The method of claim 1, wherein the subsea structure is in situ on a seabed, and the pipe restraint device is a pipe tapping clamp that is pre-installed in the subsea structure.

8. The method of claim 1, further comprising moving the pipe restraint device to a second configuration in which the pipeline is clamped by the pipe restraint device to restrict longitudinal movement of the pipeline.

9. The method of claim 1, further comprising:
   clamping the pipeline using a pipe tapping clamp to thereby restrict longitudinal movement of the pipeline; and
   tapping the pipeline through the pipe tapping clamp.

10. The method of claim 9, further comprising connecting a conduit between the pipe tapping clamp and the subsea structure to thereby provide fluid communication between the pipeline and the subsea structure.

11. The method of claim 9, wherein the pipeline is tapped before production of hydrocarbons through the pipeline begins.

12. The method of claim 9, wherein the pipeline is tapped after production of hydrocarbons through the pipeline has begun.

13. The method of claim 1, wherein the intermediate section of the pipeline includes a prepared section of the pipeline.

* * * * *